Jan. 20, 1970   F. E. BUSCHBOM   3,490,618
DISTRIBUTOR
Filed Nov. 15, 1967   3 Sheets-Sheet 1

INVENTOR.
FLOYD E. BUSCHBOM
BY
Burd, MacEachron, Braddock,
Bartz & Schwartz
ATTORNEYS Jan. 20, 1970  F. E. BUSCHBOM  3,490,618
DISTRIBUTOR
Filed Nov. 15, 1967  3 Sheets-Sheet 2

INVENTOR.
FLOYD E. BUSCHBOM
BY
Burd, MacEachron, Braddock, Bartz & Schwartz
ATTORNEYS

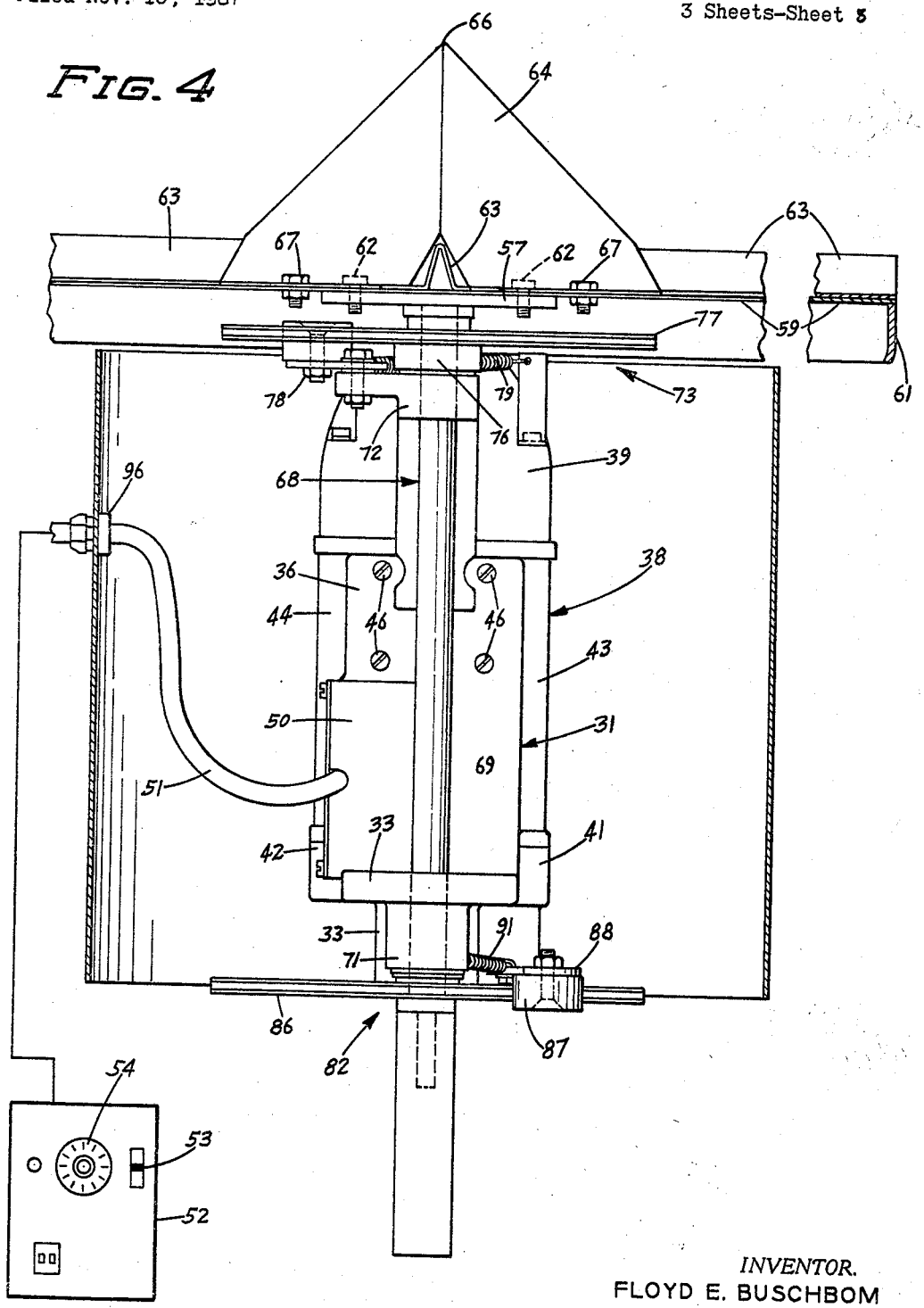

United States Patent Office 3,490,618
Patented Jan. 20, 1970

---

3,490,618
DISTRIBUTOR
Floyd E. Buschbom, Long Lake, Minn., assignor to VanDale Corporation, Long Lake, Minn., a corporation of Minnesota
Filed Nov. 15, 1967, Ser. No. 683,355
Int. Cl. B65g *65/30;* E01c *19/20*
U.S. Cl. 214—17
15 Claims

ABSTRACT OF THE DISCLOSURE

A particulate material distributor connected to the discharge end of a silo fill pipe. The distributor has a generally horizontal spinner disc rotatable about an upright axis and movable in a horizontal orbital path. A variable speed motor carrying the disc is drivably connected through a frame to a crank arm to simultaneously rotate the disc and move the disc in an orbital path. A torque arm connects the motor to a fixed support allowing the motor to move in the oribital path while preventing rotation of the motor about its axis. A remote control coupled with the motor is used to vary the speed of the spinner disc to control the pattern of distribution of the material spread in the silo.

BACKGROUND OF INVENTION

Silage distributors used in the filling of tower silos have been developed for distributing the silage in the silo. Power driven distributors are equipped with rotating members to spread and deflect the silage discharged from a silo fill pipe around the silo. The distributors shown in Patents No. 3,206,044 and 3,262,586 are examples of power driven distributors. Once these distributors are set up and operating, the pattern of distribution of the silage spread in the storage area or silo cannot be controlled. The result is that these distributors cause separation and segregation of the different sized silage particles and improper filling of the silo which can result in extensive spoilage of the silage and uneven walled pressure on the silo wall. The distributor of the present invention has a concurrent rotating and orbiting spinner disc driven by a variable speed motor connected to a motor speed control. The control is operable to change the rotational and orbital speed of the spinner to control the silage distribution pattern in such a manner that there is optimum mixing of the various size silage particles with a minimum of the silage settling away from the silo.

SUMMARY OF INVENTION

Broadly defined, the invention relates to an apparatus for distributing particulate material directed into a storage area. The apparatus specifically described is a silage distributor for spreading the silage in a tower silo. The distributor has a non-rotatable support adapted to be mounted on a silo fill pipe locating the distributor in the center area of a silo. Rotatably mounted on the support is an arm means rotatably carrying a frame. A motor mounted on the frame is drivably connected to a spinner or distributor disc extended over the frame and motor. The spinner and arm means rotate about separate upright axes. A stop means engages the support to prevent the motor from rotating about its axis and allowing the motor and frame to move in an orbital path about the axis of the arm means. A drive means connects the motor with the arm means to rotate the arm means about its axis moving both the motor and the rotating disc in an orbital path. The motor is a variable speed electric motor connected to a control means operable to change the speed of the electric motor to control the speed of rotation of the spinner as well as the speed of the orbital movement of the spinner.

In the drawings:

FIGURE 4 is an enlarged sectional view taken along the line 4—4 of FIGURE 1 with a shield around the drive mechanism shown in section;

Figure 1:
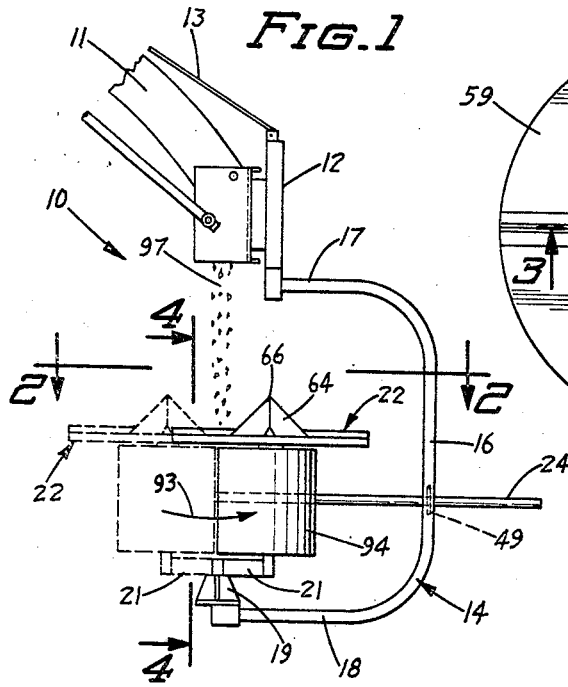
FIGURE 1 is an elevational view of the distributor of the invention mounted on the discharge end of a silo center fill pipe.

Referring to the drawings there is shown in FIGURE 1, the distributor of the invention indicated generally at 10 releasably connected to a center fill pipe 11 by a two part mount 12. A cable 13 holds the parts of the mount 12 in assembled and non-rotatable relationship locating the distributor 10 under the discharge end of the center fill pipe 11. The details of the center fill pipe and mount are disclosed in co-pending patent application Ser. No. 683,272, filed Nov. 15, 1967.

Secured to mount 12 is a non-rotatable support indicated generally at 14 having an upright base 16, a horizontal upper leg 17 and a horizontal lower leg 18. Support 14 is a large caliper shaped tubular member located in a generally vertical plane with the legs 17 and 18 extended away from the discharge end of the center fill pipe 11. Secured to the end of lower leg 18 is an upright bearing 19 carrying a generally horizontal arm 21. The entire drive and support structure for spinner 22 including stop member 24 is rotatably carried on the arm 21.

Figure 3:
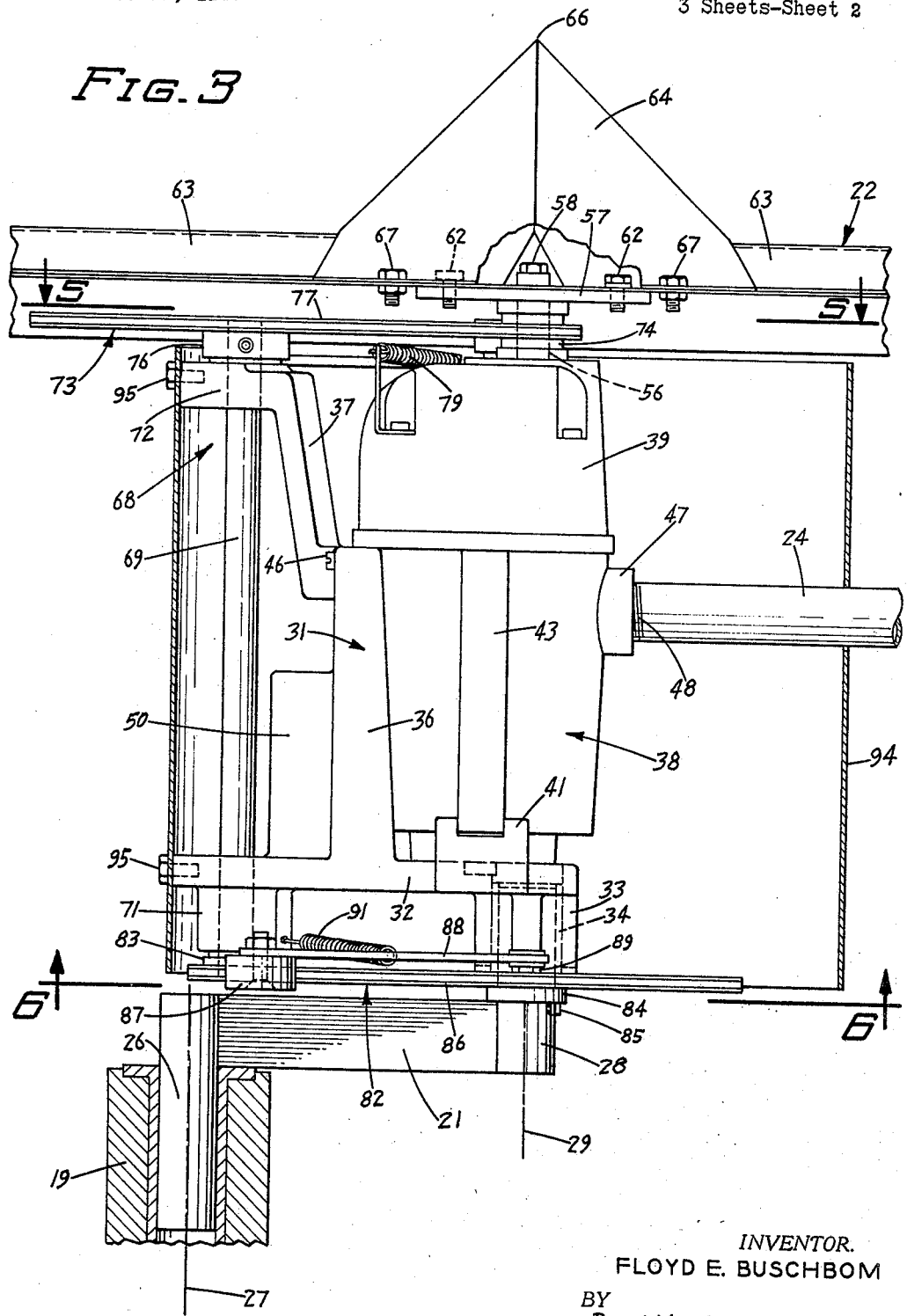
FIGURE 3 is an enlarged sectional view taken along the line 3—3 of FIGURE 2.

Referring to FIGURE 3, arm 21 has a downwardly extended rod 26 projected into a sleeve carried in bearing 19. The rod 26 being rotatable in the bearing 19 provides a first upright rotational axis 27 for the distributor 10. Rod 26 can be removed from bearing 19 by raising the arm 21 thereby removing the drive means, motor and spinner 22 as a single assembly from the support 14. The opposite or outer end of arm 21 has an upright rod 28 providing a second upright axis 29.

Rotatably mounted on rod 28 is a frame indicated generally at 31. The frame 31 has a horizontal base 32 formed with a downwardly projected boss 33 having a bore receiving a sleeve bearing 34 telescoped over the upper end of rod 28 to rotatably mount the frame on the arm 21. Mid-portion of the base 31 has an upwardly projected back 36 joined to an upwardly and outwardly extended arm 37. An electric motor indicated generally at 38 is mounted on the frame. The motor 38 is a variable speed electric motor having a speed reduction gear head 39. For example, motor 38 may be a common series motor used in electric hand drills and like tools. As shown in FIGURE 4, base 32 has upwardly projected side ears 41 having a U-shaped slot for accommodating upright side ribs 42 and 43 on the motor housing. The motor is held in assembled relation on the ears 41 and 42 and back 36 by a plurality of bolts 46 securing the motor housing to the back 36.

The side of the motor opposite back 36 has a threaded socket 47 for receiving the threaded end 48 of the stop member 24. Stop member 24 is shown as an elongated tubular member which extends laterally from the motor adjacent the upright base 16 of support 14. A loop 49 secured to the side of support base 16 extends around the member 24 so that the member 24 serves as a stop or torque arm preventing rotation of the motor about its axis. Loop 49 permits the member 24 to move along its longitudinal axis so that member 24 does not interfere with the orbital movement of the distributor. As shown in FIGURES 3 and 4, the back 36 has a junction box 50 for the electrical connections to the motor 38. A cord 51 leads from junction box 50 to a control box 52 mounted in a remote location where it is readily accessible. For example, control box 52 may be mounted at the base of the silo. The control box 52 has an on and off switch 53 and a motor speed control knob 54 which operates electric power controls, as a variable resistor, to change the speed of the variable speed electric motor 38. Returning to FIGURE 3, the speed reduction gear head 39 has an upright drive shaft 56 carrying a horizontal plate 57. A bolt 58 secures the plate to the drive shaft 56. Positioned on the plate 57 is the spinner 22. Bolts 62 secure the spinner 22 to plate 57 so that the spinner is mounted directly to the drive of the motor 38.

Figure 2:
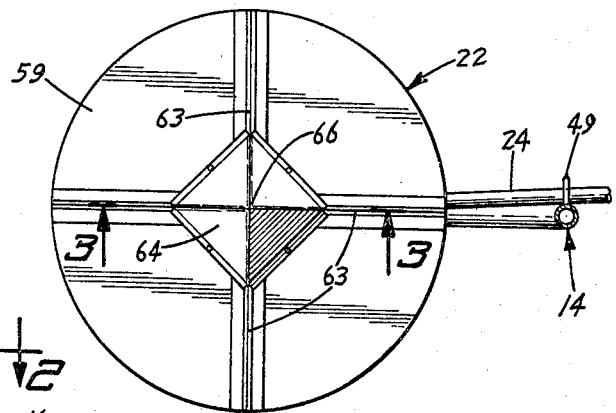
FIGURE 2 is an enlarged sectional view taken along the line 2—2 of FIGURE 1.

Referring to FIGURES 2 and 4, spinner 22 comprises a circular flat distributor disc 59 having a downwardly projected peripheral flange 61. Secured to the top of disc 59 are four equally spaced radial ribs 63 having an inverted V-shaped cross section. The ribs are secured by welds or similar fastening means to the top surface of disc 59.

Mounted on the center portion of the disc 54 over the inner ends of ribs 63 is an upright deflector 64 for directing material discharged onto the center area of the disc to the outer portions of the disc. Deflector 64 is a four sided generally pyramid shaped structure having an apex point 66 located along the axis of the drive shaft 56. The four faces of the deflector are flat and have a triangular shape. Each face is directed toward a quadrant of the disc between the ribs 63. Bolts 67 secure the deflector 64 to the top surface of the disc.

As shown in FIGURES 3 and 4, a drive mechanism indicated generally at 68 connects the motor 38 to the arm 21 so that on operation of the motor the arm moves about the axis 27 and concurrently with the rotation of the spinner 22 about the axis of shaft 56. Thus, spinner 22 simultaneously rotates and moves in an orbital path as shown in the dotted and full lines in FIGURE 1.

Figure 5:
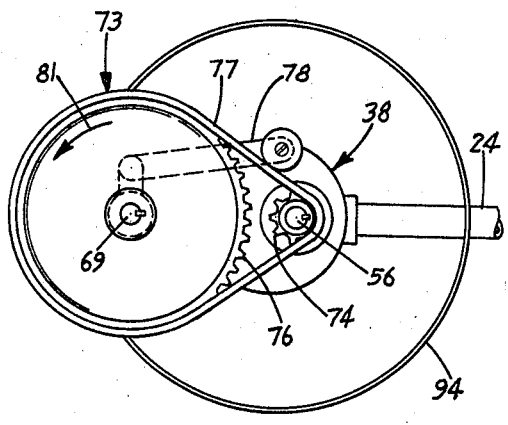
FIGURE 5 is a reduced sectional view taken along the line 5—5 of FIGURE 3.

Drive mechanism 68 comprises an upright shaft 69 rotatably mounted in a boss 71 on one end of base 32 and a bearing 72 in the end of the arm 37. The upper end of shaft 69 is connected with a power transmitting means 73 to the drive shaft 56. Power transmitting means 73, shown in FIGURE 5, comprises a small sprocket 74 keyed or otherwise secured to drive shaft 56. Aligned with the sprocket 74 is a large sprocket 76 keyed to the shaft 69. A roller chain 77 is trained about the sprockets 74 and 76. A tightener 78 biased by spring 79 into engagement with the chain maintains proper engagement of the chain with the sprockets. Operation of the motor 38 drives sprocket 76 in the direction of the arrow 81.

Figure 6:
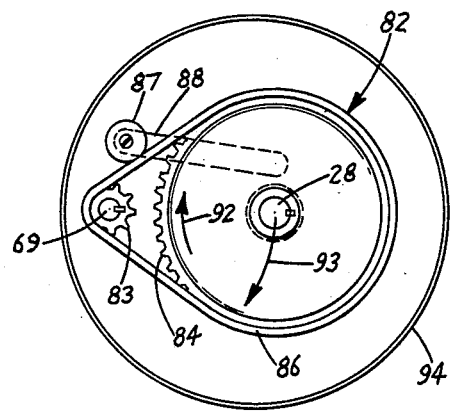
FIGURE 6 is a reduced sectional view taken along the line 6—6 of FIGURE 3.

Secured to the lower end of shaft 69 is a second power transmitting means indicated generally at 82. As shown in FIGURE 6, power transmitting means 82 comprises a small sprocket 83 keyed to the shaft 69 and an aligned large sprocket 84 keyed to the upright rod 28 of arm 21. A roller link chain 86 trained about sprockets 83 and 84 transmits power from shaft 69 to the arm 21 with the result that the arm is rotated about the axis 27 of the rod 26 mounted in bearing 19. As shown in FIGURE 3, a belt tightener comprising a roller 87 carried on arm 88 engages chain 86. The inner end of the arm 88 is pivoted by pivot member 89 to the frame 31. A spring 91 biases the roller 87 into engagement with the chain 86.

Returning to FIGURE 6, the power transmitting means 82 applies a force on sprocket 84 in the direction of the arrow 92 with the result that the arm 21 along with the frame 31 and motor 38 are carried along a circular path indicated by arrow 93 about axis 27. This circular movement causes the spinner 22 to move in an annular or orbital path concurrently with rotation of the spinner about its axis.

The entire frame 31, motor 38 and drive mechanism 68, are enclosed within a cylindrical shield 94 secured to the frame with a pair of bolts 95. As shown in FIGURE 3, the stop or torque member 24 projects through a suitable hole in the shield outwardly into engagement with support 14. The shield 94 carries a bushing 96 for the cord 51 providing a support which relieves the strain on the cord and its connections in the junction box 50.

Returning to FIGURE 1, in use, the distributor 10 is mounted in assembled relation with the discharge end of the fill pipe 11 with the deflector 64 facing the discharge opening of the fill pipe. The material 97 directed downwardly onto the spinner 22 falls on spinner 22 radially outwardly from the center of the spinner. Any material that is directed onto the center of the spinner is deflected outwardly by the inclined surfaces of the deflector 64. The operation of the spinner 22 is not affected by the velocity of silage directed onto the spinner. The spinner 22 has a diameter such that it covers the upper end of the shield 94 and extends over the axis of the arm 21 and bearing 19. Thus, as the spinner 22 moves around the orbit path indicated by arrow 93 a peripheral portion of the spinner disc will always be aligned with the material being discharged from the fill pipe.

As shown in FIGURE 3, the crank arm is readily inserted into the bearing 19 so that the support may be separated from the remainder of the distributor enabling the distributor to be passed through an ordinary door in the silo. With the distributor assembled on the end of the fill pipe as shown in FIGURE 1, the torque arm 24 projects through the loop 49 secured to the support 14 to hold the motor and frame from rotating about the axis of the motor. When power is supplied to the motor 38 spinner 22 is rotated about the axis of the drive shaft 56. This axis coincides with the second axis 29 of the crank arm so that the spinner will follow the angular movement of the crank arm. The motor is also connected through the drive mechanism 68 to the crank arm so that arm 21 is positively moved angularly about the first upright axis 27 thereby moving the motor, frame and disc in a circular path. The large sprocket 84 being keyed to the rod 28 of the arm 21 functions as a stationary gear for receiving the chain 86 driven by the small sprocket 83 mounted on the shaft 69. The fixed sprocket 84 is moved in a circular path about the first upright axis 27 by the rotational force of the small sprocket 83 on the chain 86. The large and small sprockets of the power transmitting means 73 and 82 reduce the orbital speed of the distrbiutor substantially below the speed of rotation of the spinner 22.

The control box 52 is operable to vary the speed of the motor 38 thereby changing the speed of rotation of the spinner as well as the orbital speed of the spinner. For example, the control box is capable of varying the rotation of the spinner 22 from twenty to five hundred fifty r.p.m. This allows the operator to set and electrically control the silage distribution pattern during the filling of the silo. Under ordinary conditions spinner 22 should be operated at a minimum of speed until the silo is approximately half full. From this point to the top of the silo the speed of the spinner should be gradually increased until the silo is topped off. By increasing the speed of the spinner 22 the silage will be directed toward the silo wall in an optimum pattern without the need of baffles or forks until the silo is full.

The distributor is usable for silos which vary in diameter. The speed of rotation of the spinner 22 can be varied according to the diameter of the silo and the mixture and density of the silage being discharged into the silo. The speed of the rotation and orbiting of the spinner is also varied to provide an optimum distribution pattern without causing classification of the larger heavier from the lighter silage particles. The distribution pattern of the distributor reduces to minimum the problem of the silage settling away from the silo wall thereby providing for maximum tonnage capacity of the silo with a minimum of spoilage.

While there have been shown and described the distributor as applied to a preferred embodiment of the invention, it is to be understood that various changes, substitutions, and alternations in the shape and details of the distributor illustrated may be made by those skilled in the art without departing from the spirit and scope of the invention.

The embodiments of the invention in which an exclusive property or privilege is claimed are defined as follows:

1. An apparatus for distributing particulate material directed into a storage area comprising: a non-rotatable support, an arm means rotatably mounted on the support for movement about a first upright axis, a frame means rotatably mounted on the arm means for movement about a second upright axis spaced from the first upright axis, a motor mounted on the frame, stop means engageable with said support to prevent said motor from rotating about the axis of the motor, movable means rotatable about a third upright axis operably connected to said motor, a spinner connected to the movable means to rotate with said movable means, and drive means connecting the motor with the arm means to rotate said arm means about the first axis concurrently with rotation of the spinner about the third axis.

2. The apparatus of claim 1 wherein said support includes mount means for releasably connecting the support to the discharge end of a tower silo fill pipe.

3. The apparatus of claim 1 wherein said support has a member extended below said arm means, said member carrying bearing means rotatably mounting the arm means on the support.

4. The apparatus of claim 1 wherein said stop means comprises a torque arm secured to said motor, projected outwardly from the motor, and engageable with said support.

5. The apparatus of claim 1 wherein said movable means comprises an upwardly directed drive shaft of the motor.

6. The apparatus of claim 1 wherein said third upright axis coincides with said second upright axis.

7. The apparatus of claim 1 wherein said motor is a variable speed electric motor and control means coupled to said electric motor for changing the speed of said electric motor.

8. The apparatus of claim 1 wherein the spinner includes a circular member and an upwardly converging deflector mounted on the center portion of the circular member to deflect material discharged on the spinner outwardly of the axis of rotation of the spinner.

9. The apparatus of claim 1 wherein said drive means includes an upright shaft rotatably mounted on said frame, first power transmitting means connecting the motor to the upright shaft and second power transmitting means connecting the upright shaft to the arm means, said second power transmitting means including a circular member secured to said arm means.

10. The apparatus of claim 9 wherein said drive means rotates said arm means slower than the speed of rotation of the spinner.

11. An apparatus for distributing particulate material directed into a storage area comprising: a nonrotatable support, a motor, a spinner with a generally vertical axis located over the motor, mount means positioning the spinner for rotation about a second generally vertical axis spaced from said vertical axis of the spinner whereby the spinner concurrently rotates about its axis and orbits about the second axis, a first drive connecting the motor with the spinner, said first drive including means mounting the spinner for rotation about its axis, and a second drive operably connected to the first drive for moving the spinner in a generally horizontal orbital path concurrent with the rotation of the spinner, said second drive having a nonrotatable member cooperating with a rotatable member to move the spinner in said orbital path about said second axis.

12. The apparatus of claim 11 wherein: said nonrotatable member is a non-rotatable sprocket drivably connected with a rotatable sprocket.

13. The apparatus of claim 12 wherein: the rotatable sprocket is drivably connected to the first drive means.

14. The apparatus of claim 11 including an upwardly inclined member mounted on top of the spinner.

15. The apparatus of claim 11 wherein: said motor is a variable speed electric motor, and control means coupled to said motor for changing the speed of the motor.

References Cited

UNITED STATES PATENTS

| | | | |
|---|---|---|---|
| 3,248,117 | 4/1966 | Donelson | 214—17 XR |
| 3,349,930 | 10/1967 | Welborn | 214—17 |
| 3,291,325 | 12/1966 | Henningsen et al. | 214—17 |

ROBERT G. SHERIDAN, Primary Examiner

U.S. Cl. X.R.

239—665, 687